(12) United States Patent
Claudon et al.

(10) Patent No.: US 11,692,908 B2
(45) Date of Patent: Jul. 4, 2023

(54) EXTERNAL LOADING TEST APPARATUS HAVING A TEST SUBSYSTEM FOR APPLYING A FORCE TO SIMULATE LOADING

(71) Applicant: GE Energy Power Conversion Technology Limited, Warwickshire (GB)

(72) Inventors: Pierre-Antoine Claudon, Fleury (FR); Bruno Trapletti, Champigneulles (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 13 days.

(21) Appl. No.: 17/390,728

(22) Filed: Jul. 30, 2021

(65) Prior Publication Data
US 2022/0042878 A1    Feb. 10, 2022

(30) Foreign Application Priority Data
Jul. 30, 2020    (EP) .................................. 20315372

(51) Int. Cl.
*G01M 13/025* (2019.01)
*G01L 5/00* (2006.01)

(52) U.S. Cl.
CPC ......... *G01M 13/025* (2013.01); *G01L 5/0061* (2013.01)

(58) Field of Classification Search
CPC ............................ G01L 5/0061; G01M 13/025
See application file for complete search history.

(56) References Cited

U.S. PATENT DOCUMENTS

| | | | | |
|---|---|---|---|---|
| 3,538,759 A | * | 11/1970 | Schrom | G01M 15/02 192/63 |
| 3,710,617 A | * | 1/1973 | Andersen | B64F 1/26 181/213 |
| 4,176,547 A | * | 12/1979 | McClure | G01L 3/108 73/862.29 |
| 4,328,703 A | * | 5/1982 | McClure | G01L 5/133 73/112.04 |
| 4,788,855 A | * | 12/1988 | Laskody | G01L 5/133 73/112.04 |

(Continued)

FOREIGN PATENT DOCUMENTS

| | | |
|---|---|---|
| CN | 110132599 A | 8/2019 |
| CN | 110646124 A | 1/2020 |

(Continued)

OTHER PUBLICATIONS

European Search Report from EP Appl. No. 20315372.1, dated Feb. 3, 2021.

*Primary Examiner* — Eric S. McCall
(74) *Attorney, Agent, or Firm* — Wood IP LLC

(57) ABSTRACT

External loading test apparatus having a test subsystem includes a structure with at least three pillars supporting a platform, the platform being configured to receive a podded electric propulsion motor in a hanging position while allowing operation of said pod, and the test subsystem for applying a force on the pod to simulate full scale external loading. The test subsystem comprises a pod actuator interface, an actuator, and an actuator structure interface.

20 Claims, 4 Drawing Sheets

(56) References Cited

U.S. PATENT DOCUMENTS

| | | | | |
|---|---|---|---|---|
| 4,932,628 | A * | 6/1990 | Pacheco | F16M 3/00 |
| | | | | 248/676 |
| 5,396,791 | A * | 3/1995 | Mollmann | F01D 25/285 |
| | | | | 269/46 |
| 5,851,007 | A * | 12/1998 | Swartzlander | B25H 1/0007 |
| | | | | 269/22 |
| 7,726,182 | B1 * | 6/2010 | Newlin | G01M 15/02 |
| | | | | 73/116.01 |
| D856,626 | S * | 8/2019 | Freilich | D34/31 |
| 11,460,373 | B2 * | 10/2022 | Monahan | G01M 15/02 |
| 2009/0320578 | A1 * | 12/2009 | Peltzer | G01M 15/14 |
| | | | | 73/116.03 |
| 2011/0011168 | A1 * | 1/2011 | Schrotter | G01M 15/044 |
| | | | | 73/116.02 |
| 2014/0356135 | A1 * | 12/2014 | French | H02K 7/1823 |
| | | | | 415/121.3 |
| 2017/0320584 | A1 * | 11/2017 | Menheere | B64D 27/24 |
| 2018/0347405 | A1 * | 12/2018 | Schmidt | G01H 1/003 |
| 2019/0346002 | A1 * | 11/2019 | Davis | F16F 3/00 |
| 2020/0011760 | A1 * | 1/2020 | Richards | G01M 5/0016 |
| 2020/0109685 | A1 * | 4/2020 | Kupratis | F02K 3/06 |
| 2021/0172333 | A1 * | 6/2021 | Suciu | F02K 3/06 |
| 2021/0355881 | A1 * | 11/2021 | Lefebvre | F02C 7/36 |
| 2022/0074815 | A1 * | 3/2022 | Monahan | G01M 15/02 |

FOREIGN PATENT DOCUMENTS

| | | |
|---|---|---|
| CN | 108918080 B | 5/2020 |
| KR | 101557428 B1 | 10/2015 |

* cited by examiner

EXTERNAL LOADING TEST APPARATUS HAVING A TEST SUBSYSTEM FOR APPLYING A FORCE TO SIMULATE LOADING

TECHNICAL FIELD

The present invention relates to full scale test rigs, in particular, test rigs for conducting external load testing of ship propeller pods, in particular ice loading tests.

In order to improve steering of large ships, thrust vectorization is becoming increasingly common. Such vectorization enables using the main propulsion propeller for lateral or reverse movement. In order to achieve such a vectorization, the main propeller is fitted on a pod enabling transmission of engine power while allowing rotation of the propeller direction.

BACKGROUND

Strict regulation requires that such pods are able to withstand the pressure of ice blocks that can be encountered in artic seas.

Up to now, compliance with said regulations were achieved thanks to a combination of design safety margins and trials on scaled down prototypes, within a statistical approach. Such trials are commonly called ice loading tests.

However, clients now commonly require that each pod is guaranteed for compliance. Individual testing of each pod is therefore required. It is also required that the testing is performed before it is fitted in order to avoid damages to the ship.

From the state of the art, the following documents are known.

Document WO2019-011927A1 discloses a method for determining the direction and the amplitude of a force applied to a propulsion nacelle, comprising stress direction identification.

Document CN103913291 discloses a pod propelling system testing device comprising means for measuring torque and thrust created by a pod propelling system.

No test rig able to perform full scale external load testing on a propeller pod exists.

SUMMARY

An object of the invention is an external loading test apparatus comprising a structure with at least three pillars supporting a platform, the platform being configured to receive a podded electric propulsion motor in a hanging position while allowing operation of said pod, at least a test subsystem, for applying a force on the pod to simulate full scale external loading.

A test subsystem can comprise a pod actuator interface, an actuator and an actuator structure interface, the actuator structure interface comprises a frame intended to be removably fixed to the structure and means forming a rotational joint with the actuator, so that the actuator is anchored to the structure while retaining at least one degree of rotation, the actuator comprising an actuator body and an actuator rod configured so that the actuator rod extends from or retracts into the actuator body upon command.

The pod actuator interface can comprise a bore for mating with a pod output shaft on one side and an actuator rotational joint with the actuator rod on the opposite side.

A torque measurement device can be fitted on a test subsystem, the torque measurement device comprising two connecting rods connecting the pod actuator interface to the structure along with force sensors affixed on each connecting rod, the torque being determined based on the measured forces, the dimensions of the connecting rods and the dimensions of the test apparatus.

The force can be applied on a direction different from the direction of the pod output shaft.

The pod actuator interface can comprise a plate fitted with a pod shape compensating element in contact with the pod on one side and a rotational joint with the actuator rod on the opposite side.

The actuator structure interface can comprise a frame or a beam for removably fixing the test subsystem to the structure.

A test subsystem can apply the force along a direction sensibly matching the direction of the pod output shaft.

A test subsystem can apply the force along a vertical direction.

The test subsystem actuator can be a hydraulic jack, a magnetic actuator or an Archimedes screw.

The pod can be rotatably fixed to the platform, the pod rotation contributing to apply the force on different directions.

The test subsystems can be removably fixed to the structure.

The test apparatus can comprise command means for commanding the rotation of the pod, the at least one actuator, and, when applicable, the force sensors.

The command means can be able to perform continuous, variable or cyclic external loading.

The test apparatus can be used for ice loading testing.

BRIEF DESCRIPTION OF THE DRAWINGS

The present invention will be better understood from studying the detailed description of a number of embodiments considered by way of entirely non-limiting examples and illustrated by the attached drawing in which.

DETAILED DESCRIPTION

Ice loading test is a particular case of external loading test, wherein an external load is applied to a podded electric propulsion motor.

The external loading test apparatus described herein present the advantage to be self-supporting as it does not require complex civil engineering works prior to operation. It does not require either that the civil engineering works are resilient to the reaction forces involved in the testing.

Figure 1:
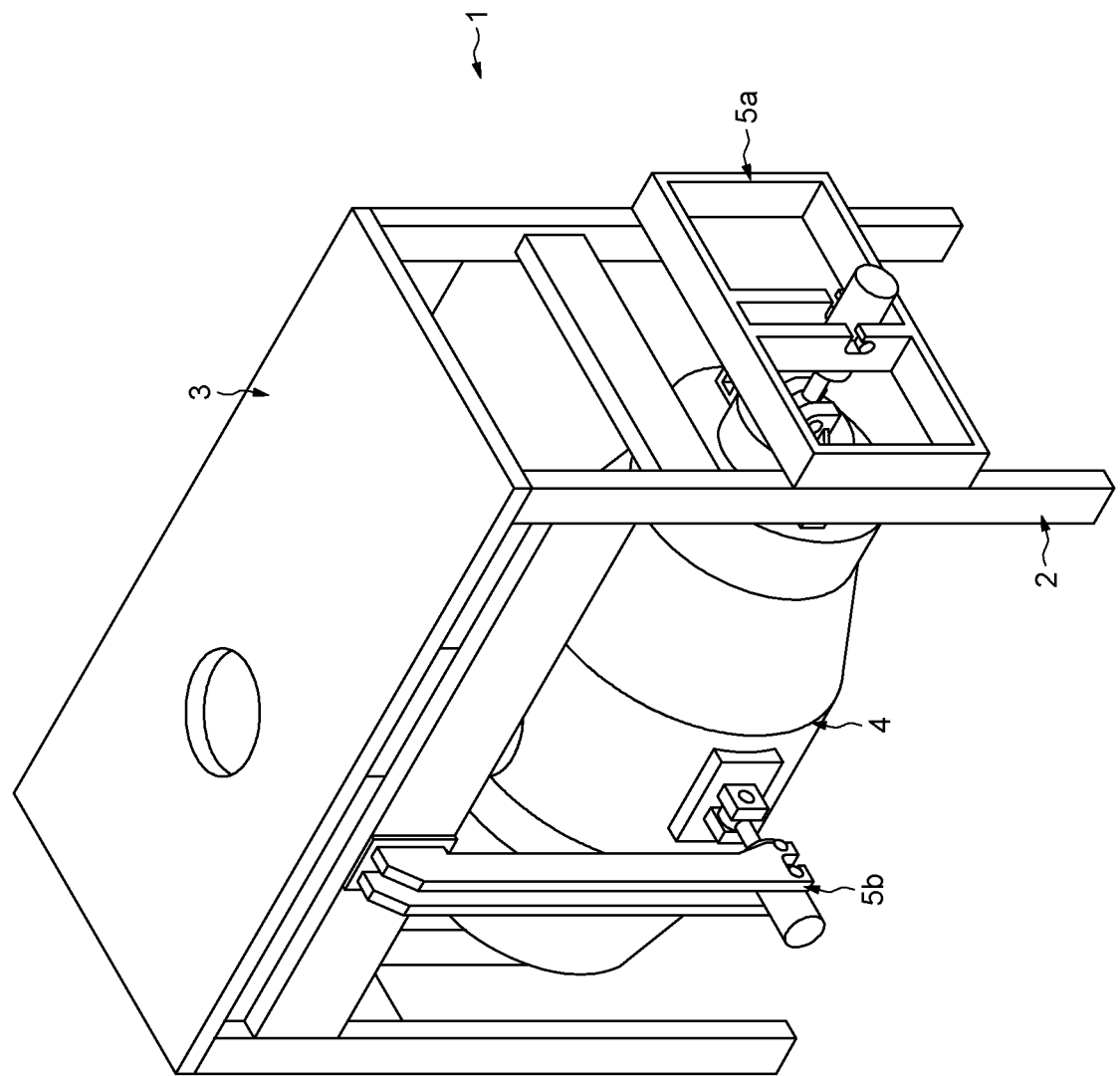
FIG. 1 shows an embodiment of the external loading test apparatus.

The external loading test apparatus comprises a structure with at least three pillars supporting a platform receiving a podded electric propulsion motor ("pod") and providing the auxiliary systems required for operating said pod, in particular hydraulic and electric power. FIG. 1 illustrates a particular embodiment of the external loading test apparatus 1 with four pillars 2.

More particularly, the platform 3 comprises a collar mating with a complimentary collar on the pod 4, and allowing both securing and rotating the pod. At least one of the collars comprises a bearing allowing lasting rotating capabilities. Mating can be achieved by bolting. Once fixed to the platform, the propeller pod hangs below the platform in a way similar to the way it is fitted on a ship. Such arrangements are considered standard practice for fitting a pod on the outer hull of a ship and are therefore not described further.

The structure 2,3 can be fitted with different subsystems 5a, 5b for external loading tests, in particular an axial test subsystem 5a and/or a lateral test subsystem 5b. Thanks to the collar and the auxiliary systems, the pod can be operated and rotated as it would be on a ship. The rotation of the pod combined with the placement of different test subsystems 5a, 5b enables external loading tests on the pod along different directions. External loading can also be applied to the pod propeller.

Figure 2:
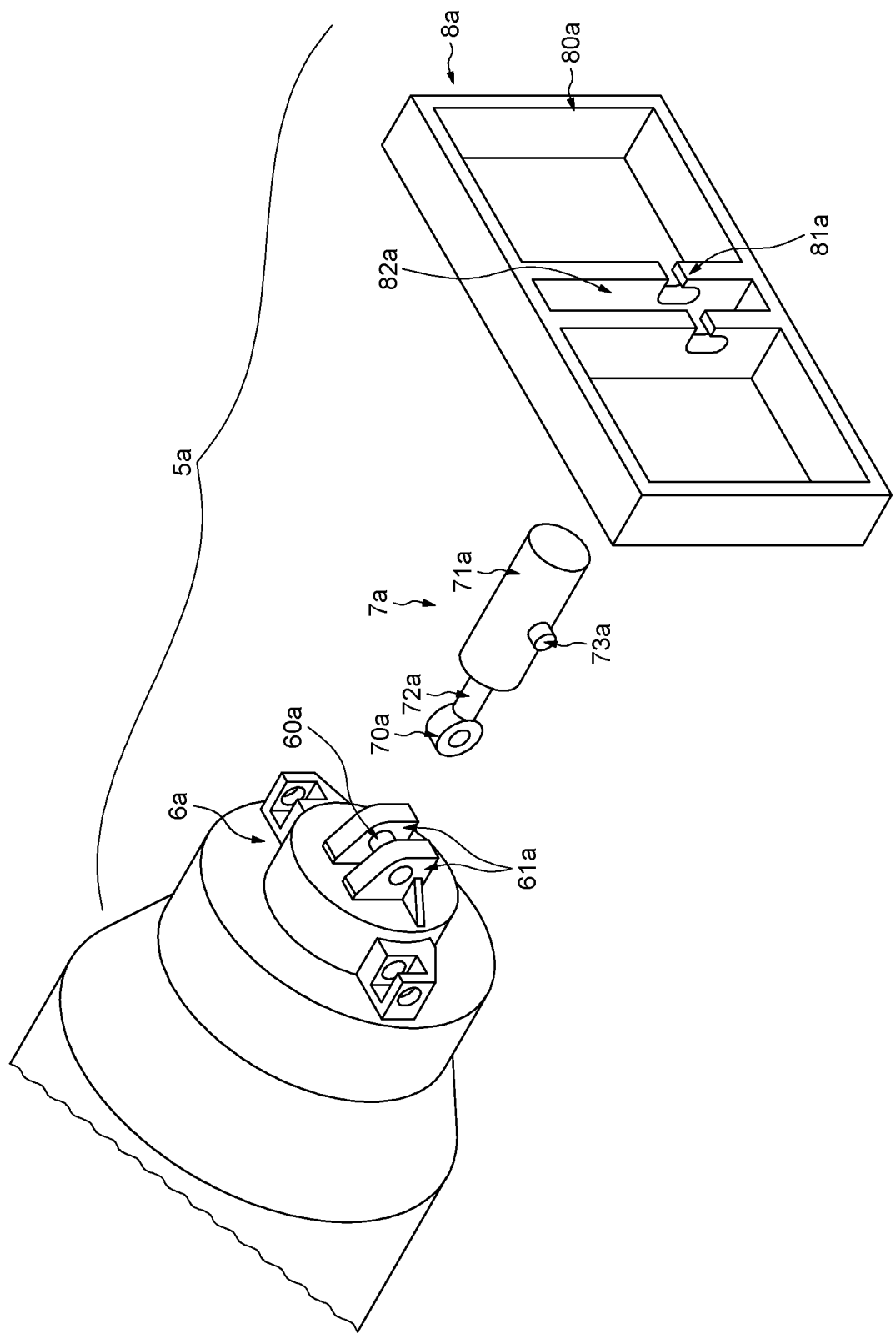
FIG. 2 shows an axial test subsystem.

FIG. 2 illustrates the axial test subsystem 5a as an exploded view. It comprises a pod actuator interface 6a, and an actuator 7a and an actuator structure interface 8a.

The pod actuator interface 6a fits on the pod output shaft upon which the propeller is destined to be fitted. On a side, the pod actuator interface 6a thereby comprises a bore similar to the bore present on the propeller so that it can be secured on the pod shaft. On an opposite side, the pod shaft actuator interface 6a comprises a rotational joint with the actuator. On FIG. 2, the rotational joint comprises two pin holes 61a designed to cooperate with both a corresponding bore 70a into an actuator rod and a pin 60a.

The actuator 7a comprises an actuator body 71a and an actuator rod 72a, the rod extending from or retracting into the actuator body upon command. The actuator comprises the bore 70a at the actuator rod free end and two gudgeons 73a apart from the actuator body 71a. When the actuator is extending, distance between the bore and the gudgeons increases. The gudgeons are part of a second rotational joint with the actuator structure interface 8a. The external loading test apparatus is not limited to using a trunnion joint for the second rotational joint as represented on FIG. 2.

The actuator structure interface 8a enables anchoring the actuator body 71a to the external loading test apparatus structure 2,3 so that a force is produced on the pod output shaft when the actuator rod is extending.

In order to do so, the actuator structure interface 8a comprises a frame 80a intended to be removably fixed to the structure 2,3 along with two half cylinders 81a linked to the frame by supporting members 82a. The half cylinders form a trunnion bearing (or trunnion joint) with the two gudgeons on the actuator body. Other forms of rotational joint can be used in replacement to the trunnion bearing. Thanks to the trunnion joint, the actuator is able to rotate around an axis extending through the gudgeons and the half cylinders. Such a rotation enables the axial test subsystem to accommodate different angles between the pod output shaft and the platform.

In a particular embodiment, the structure comprises multiple fixation points for the actuator structure interface, so that it can be fitted at different distances relative to the platform. It enables the test subsystem to accommodate different sizes of pods.

Figure 3:
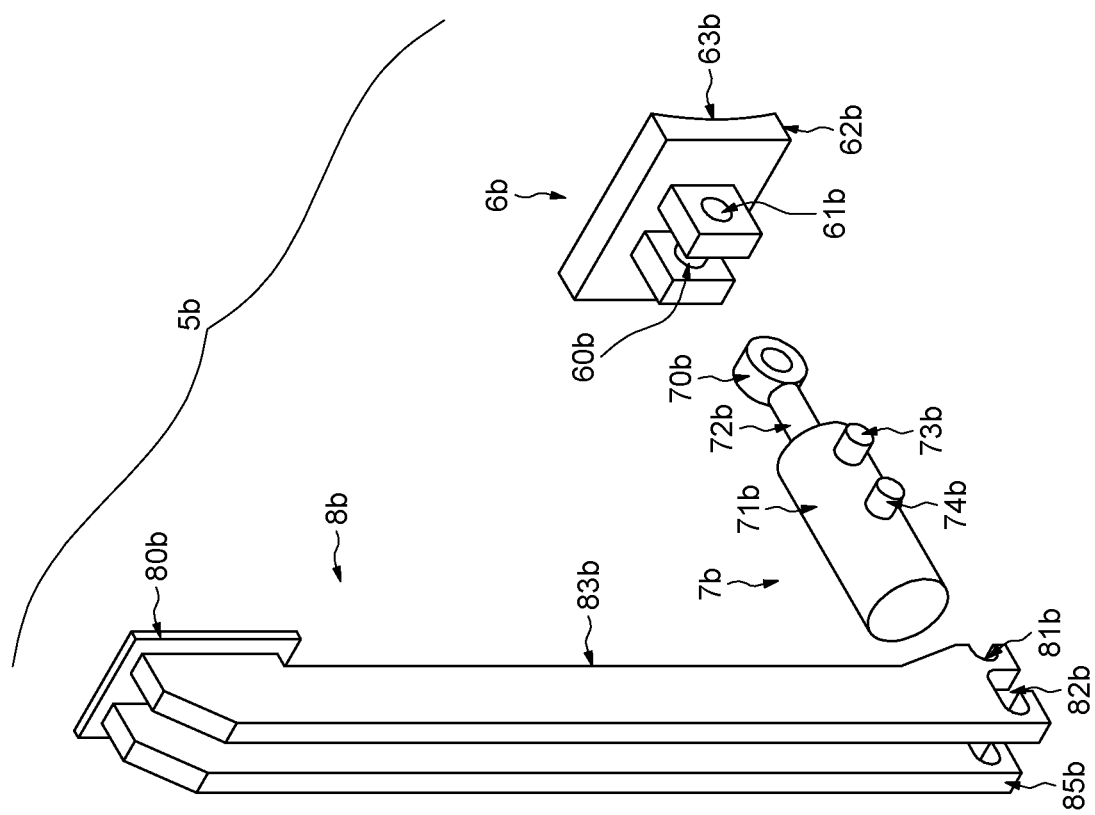
FIG. 3 shows a lateral test subsystem.

FIG. 3 illustrates an exploded view of a lateral test subsystem 5b. The lateral test subsystem comprises a pod actuator interface 6b, an actuator 7b and a structure actuator interface 8b, and is thus similar to the axial ice loading subsystem 5a.

On a side, the pod actuator interface comprises two pin holes 60b designed to cooperate with both a corresponding bore 70b into an end of the actuator and a pin 61b. Such an arrangement allows for securing the connection between the pod actuator interface and the actuator while allowing one degree of rotation. As previously stated, such an arrangement is an example of a rotational joint that can be used in the test subsystem. Other rotational joints can be considered as long as they withstand the forces involved.

An opposite side of the pod actuator interface comprises a plate 62b and a pod shape compensating element 63b stacked above said plate, so that the actuator applies a force on the plate, the plate applying a force on the pod shape compensating element, which, in turn, applies a force on the pod casing. Depending on the shape of the pod casing, the pod shape compensating element 63b can present a complex shape in order to mate both the shape of the casing and the orientation of the plate. It can also be made of a compressible or deformable material so that its shape is altered under applied pressure to match the shape of the casing.

The actuator 7b comprises an actuator body 71b and an actuator rod 72b, the rod extending from or retracting into the actuator body 71b upon command. The actuator 7b comprises a bore 70b at the actuator rod free end and two gudgeons 73b apart from the actuator body. When the actuator is extending, distance between the bore and the gudgeons increases.

The actuator structure interface 8b comprises a frame 80b intended to be removably fixed to the structure along with two half cylinders 81b linked to the frame by supporting members. The half cylinders form a trunnion bearing with the two gudgeons of the actuator. Rotational joint different than the trunnion bearing can be considered.

Depending of the number and placement of the structure pillars 2, the actuator structure interface 8b comprises a beam 83b linking the frame 80b to supporting members 82b as an arm. In a particular embodiment, the beam 83b is removably fixed to the frame 80b so that the distance of the actuator in regard to the platform 2 can be adapted. It enables the lateral test subsystem to accommodate different sizes of pods.

In a particular embodiment, the actuator comprises a second pair of gudgeons 74b each apart from the actuator body, and the actuator structure interface comprises a second pair of half cylinders 85b. In such an embodiment, two trunnion bearings are therefore formed between the actuator 7b and the actuator structure interface 8b, locking the angle of the actuator relative to the platform. In yet another embodiment, the actuator structure interface comprises a plurality of first pair of half cylinders and/or a plurality of second pair of half cylinders so that each pair of actuator gudgeons can engage two pairs of half cylinders each at different distances in regard to the platform. Such an arrangement allows achieving different angles between the platform and the actuator with a single lateral test subsystem based on the spacing between the pairs of gudgeons and the distance between the pairs of half cylinders.

Figure 4:
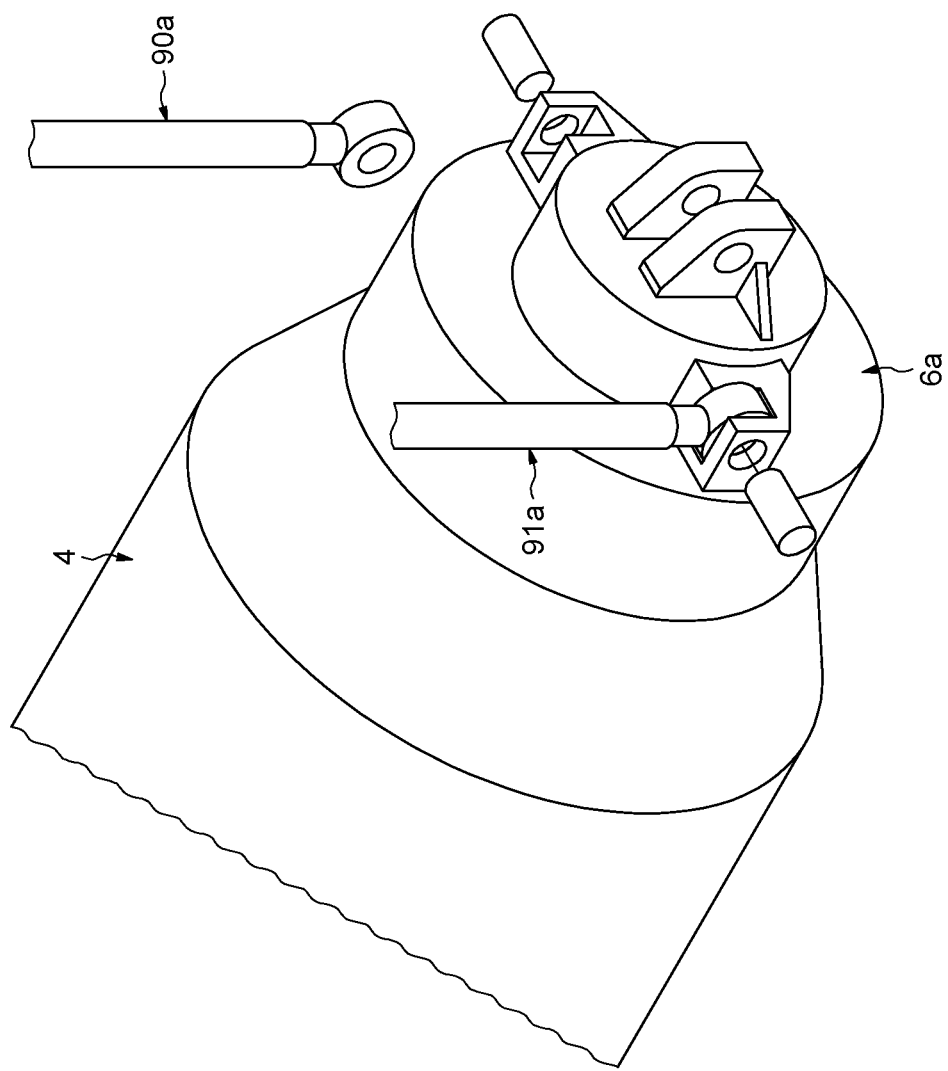
FIG. 4 shows an axial testing subsystem fitted with a torque measurement system.

Each test subsystem can be fitted with a torque measurement system, comprising two rigid connection rods extending between the pod actuator interface and the structure. At least a force sensor, like a strain gauge or a deformation gauge, is affixed on each connection rod, preferably at equal distance of the rod ends. The torque can then in turn be determined based on the dimensions of the connecting rods, of the pod actuator interface and of the structure along with the forces measured. FIG. 4 illustrates an axial testing subsystem fitted with a torque measurement system comprising two rigid connection rods 90a, 91a.

Another embodiment of a test subsystem is connected to the structure so that the actuator is positioned under the pod in order to apply the force sensibly vertically. In such an embodiment, a frame is preferred as a structure actuator interface.

The embodiments described above involve using an actuator for applying pressure on the pod. However, different actuators can be used, in particular hydraulic, magnetic or mechanical actuator. An example of a hydraulic actuator is a jack. An example of a mechanical actuator involves using an endless screw or Archimedes screw for applying forces on the pod jack interface.

The external loading test apparatus comprises a command system for commanding the rotation of the pod, the actuators, and, when applicable, the force sensors. It allows an open look or a close loop operation of the external loading test apparatus. Operation can be supervised or autonomous. Continuous, variable or cyclic external loading can be achieved.

The external loading test apparatus allows for applying a large range of forces, from few N to MN.

The external loading test apparatus as described above, does not require complex civil engineering works, as it is self-supporting. However, in some embodiments, a vertical test subsystem can be anchored to the civil engineering works below the external loading test apparatus instead of being fixed to the structure.

Finally, when comprising multiple test subsystems, the external loading test apparatus is able to simultaneously combine multiple directions of forces applied on the pod and/or its propeller for more complex testing schemes.

We claim:

1. An external loading test apparatus comprising:
   a structure with at least three pillars supporting a platform, the platform being configured to receive a pod comprising a podded electric propulsion motor having a pod propeller in a hanging position while allowing operation of said pod, and
   a test subsystem, for applying a force on the pod or pod propeller to simulate full scale external loading,
   wherein the test subsystem comprises a pod actuator interface, an actuator, and an actuator structure interface,
   wherein the actuator structure interface comprises a frame, forming a rotational joint with the actuator, so that the actuator is anchored to the structure while retaining at least one degree of rotation, and
   wherein the actuator comprising an actuator body and an actuator rod configured so that the actuator rod extends from or retracts into the actuator body upon command.

2. The test apparatus of claim 1, wherein the pod actuator interface comprises a plate fitted with a pod shape compensating element in contact with the pod on one side and a rotational joint with the actuator rod on the opposite side.

3. The test apparatus of claim 1, wherein the actuator structure interface comprises a frame or a beam for removably fixing the test subsystem to the structure.

4. The test apparatus of claim 1, wherein the test subsystem applies the force along a direction matching the direction of a pod output shaft.

5. The test apparatus of claim 1, wherein the test subsystem applies the force along a vertical direction.

6. The test apparatus of claim 1, wherein the test subsystem actuator is a hydraulic jack, a magnetic actuator or an Archimedes screw.

7. The test apparatus of claim 1, wherein the pod is rotatably fixed to the platform, with pod rotation contributing to apply the force on different directions during a test.

8. The test apparatus of claim 1, wherein the test subsystem is removably fixed to the structure.

9. The test apparatus of claim 1, wherein the test apparatus is used for ice loading testing.

10. The test apparatus of claim 1, further comprising command means for commanding at least one of the rotation of the pod, the actuator, and force sensors.

11. The test apparatus of claim 10, wherein the command means are able to perform continuous, variable or cyclic external loading.

12. The test apparatus of claim 1, wherein the pod actuator interface comprises a bore for mating with a pod output shaft on one side and an actuator rotational joint with the actuator rod on the opposite side.

13. The test apparatus of claim 12, wherein a torque measurement device is fitted on the test subsystem, the torque measurement device comprises two connecting rods connecting the pod actuator interface to the structure along with force sensors affixed on each connecting rod, the torque being determined based on forces measured by the torque measurement device, the dimensions of the connecting rods and the dimensions of the test apparatus.

14. The test apparatus of claim 12, wherein the force is applied on a direction different from the direction of the pod output shaft.

15. An external loading test apparatus comprising:
    a structure with at least three pillars supporting a platform, the platform being configured to receive a pod comprising a podded electric propulsion motor having a pod propeller in a hanging position while allowing operation of said pod,
    a test subsystem, for applying a force on the pod or pod propeller to simulate full scale external loading wherein the test subsystem comprises a pod actuator interface, an actuator, and an actuator structure interface, and
    command means for commanding at least one of the rotation of the pod, the actuator, and a force sensor.

16. The test apparatus of claim 15, wherein the pod actuator interface comprises a bore for mating with a pod output shaft on one side and an actuator rotational joint with the actuator rod on the opposite side or the pod actuator interface comprises a plate fitted with a pod shape compensating element in contact with the pod on one side and a rotational joint with the actuator rod on the opposite side.

17. The test apparatus of claim 15, wherein the actuator structure interface comprises a frame intended to be removably fixed to the structure and means forming a rotational joint with the actuator, so that the actuator is anchored to the structure while retaining at least one degree of rotation.

18. The test apparatus of claim 15, wherein a torque measurement device is fitted on a test subsystem, the torque measurement device comprises two connecting rods connecting the pod actuator interface to the structure along with force sensors affixed on each connecting rod, the torque being determined based on the measured forces, the dimensions of the connecting rods and the dimensions of the test apparatus.

19. The test apparatus of claim 15, wherein the test subsystem actuator is a hydraulic jack, a magnetic actuator or an Archimedes screw and the command means are able to perform continuous, variable or cyclic external loading.

20. The test apparatus of claim 15, wherein the pod is rotatably fixed to the platform, the pod rotation contributing to apply the force on different directions.

* * * * *